(12) United States Patent
Rendon

(10) Patent No.: US 12,564,142 B1
(45) Date of Patent: Mar. 3, 2026

(54) 5 DIMENSIONAL ANALOG-AUTOMATED OBJECT TO GROW SEEDS WITHOUT HUMAN INTERVENTION IN ANY ENVIRONMENT

(71) Applicant: String Cubed, Inc., Winter Springs, FL (US)

(72) Inventor: Manuel Rendon, Winter Springs, FL (US)

( * ) Notice: Subject to any disclaimer, the term of this patent is extended or adjusted under 35 U.S.C. 154(b) by 0 days.

(21) Appl. No.: 18/956,166

(22) Filed: Nov. 22, 2024

(51) Int. Cl.
*A01G 9/029* (2018.01)
*A01C 1/02* (2006.01)

(52) U.S. Cl.
CPC .............. *A01G 9/0293* (2018.02); *A01C 1/02* (2013.01)

(58) Field of Classification Search
CPC ................................ A01G 9/0293; A01C 1/02
See application file for complete search history.

(56) References Cited

U.S. PATENT DOCUMENTS

| | | | | |
|---|---|---|---|---|
| 3,961,446 A | * | 6/1976 | Mason, Jr. ................ | A01G 9/16 47/79 |
| 4,000,580 A | * | 1/1977 | Biehl .................... | B65D 75/324 47/84 |
| 2015/0156973 A1 | * | 6/2015 | Prinster ................ | A01G 9/0291 47/65.7 |
| 2016/0286715 A1 | * | 10/2016 | Kraus .................... | A01C 14/00 |
| 2017/0042082 A1 | * | 2/2017 | McMillan ................ | A01C 1/06 |

FOREIGN PATENT DOCUMENTS

| | | | | | |
|---|---|---|---|---|---|
| CN | | 118901453 A | * | 11/2024 | ............ A01G 20/10 |
| CN | | 120513729 A | * | 8/2025 | .............. A01P 21/00 |
| WO | WO-2020164790 A1 | | * | 8/2020 | .......... A01G 9/0293 |
| WO | WO-2023055310 A1 | | * | 4/2023 | .............. A01C 1/06 |

* cited by examiner

*Primary Examiner* — Michael H Wang
(74) *Attorney, Agent, or Firm* — Sanchelima & Associates, P.A.; Jesus Sanchelima; Christian Sanchelima

(57) ABSTRACT

A capsule for growing seeds without human intervention. The capsule is designed with an intricate internal structure of channels, reservoirs, and nutrient pockets made from water-soluble materials like PVA with programmed densities and dissolution rates. This 5-dimensional design allows for the timed, controlled release of water and nutrients directly to the seed as the capsule dissolves over time, eliminating the need for external intervention to grow the seed in any environment.

8 Claims, 4 Drawing Sheets

5 DIMENSIONAL ANALOG-AUTOMATED OBJECT TO GROW SEEDS WITHOUT HUMAN INTERVENTION IN ANY ENVIRONMENT

II. BACKGROUND OF THE INVENTION

1. Field of the Invention

The present invention relates to the field of chemistry, mechanical engineering, agriculture, and plant cultivation, specifically to an object that incorporates the programmable dimension of density and time to the other three conventional dimensions of space to create a system for optimizing seed growth through a controlled release of nutrients and water using a 3D printing conventional manufacturing, a method to program the printing using a water-soluble materials such as polyvinyl alcohol (PVA).

2. Description of the Related Art

Current agricultural practices rely heavily on chemical fertilizers and genetic modification of seeds to achieve optimal growth conditions. These methods are not only inefficient but also potentially harmful to the environment and human health. There is a significant need for innovative solutions that can reduce the reliance on such practices, minimize water usage, provide targeted nutrient delivery to plants, lower the reliance on the quality of the soil, and automate the process of carefully growing a seed so that human intervention can be zero. Such a complex object can be achieved only if designed using a five-dimensional approach, changing in the most possible precise manner not only the thicknesses and cavities of the capsule's inside but also the density so that several different levels of flexibility can be achieved as well as different levels of hydrolyzed water-soluble materials so that water can be guided in an analog way through the capsule. This will allow an object capable of sustaining the growth of plants in difficult areas such as desert ecosystems where water and vegetation are very sparse, given that the capsule has everything the seed requires to grow, including soil, soil precursor, nutrients and water, all in a programmed and automated enclosure that will provide all needed support for any environment.

The capsule can be dropped from heights compatible with aircraft delivery, which could be pivotal in creating large amounts of vegetable food at much lower costs.

III. SUMMARY OF THE INVENTION

The invention is a five-dimensional object in the form of a capsule printed using conventional 3D printing methods with the added programmability of a multi-hydrolyzed for varying dissolution times and multi-density extrusion based on hydrolyzed water-soluble polymers' ability to expand when overheated, to automatically and in an analog manner, create a structure that provides all nutrients, water, soil, and protection required for a plant seed to fully grow. Designed to optimize plant growth by providing a programmed release of precisely what each specific specimen and species of plant needs in terms of water, sunlight, protection, and nutrients to be controlled and delivered directly to the seed itself.

The capsule is made from any water soluble material such as polyvinyl alcohol (PVA) with varying levels of hydrolysis, which allows for the creation of an intricate internal structure consisting of channels and reservoirs with different densities as well as levels of water solubility, with the intention for them to dissolve at controlled rates upon activation, ensuring a gradual and targeted distribution of water and nutrients. The capsule's design reduces the need for external interventions, human or any other, intrinsic or otherwise, such as genetic modifications or chemical fertilizers, and minimizes water wastage by ensuring that the water and nutrients are delivered directly to the seed. The capsule is activated by the mechanical force provided after being released from a certain and selectable height, which will open the first channels that will in turn, push the flow of the first stream of water.

Further objects of the invention will be brought out in the following part of the specification, wherein detailed description is for the purpose of fully disclosing the invention without placing limitations thereon.

IV. BRIEF DESCRIPTION OF THE DRAWINGS

With the above and other related objects in view, the invention consists in the details of construction and combination of parts as will be more fully understood from the following description, when read in conjunction with the accompanying drawings in which.

V. DETAILED DESCRIPTION OF THE EMBODIMENTS OF THE INVENTION

Technical Problem Solved

Figure 1:
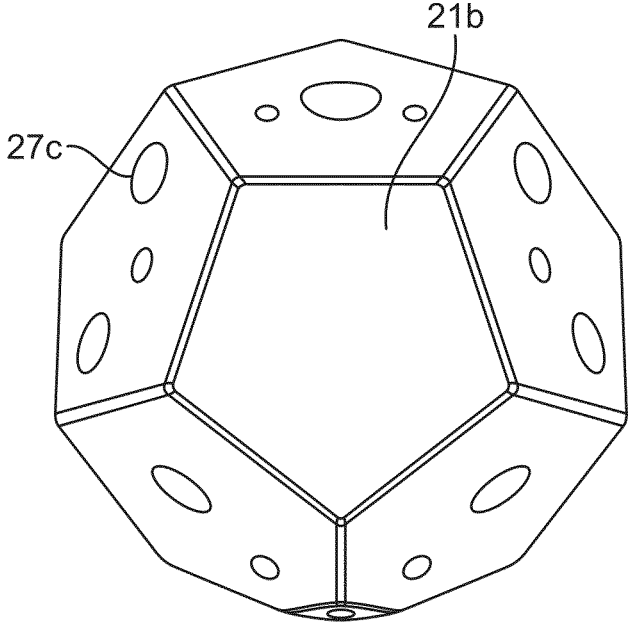
FIG. 1 represents a first perspective view of the present invention.
Figure 2:
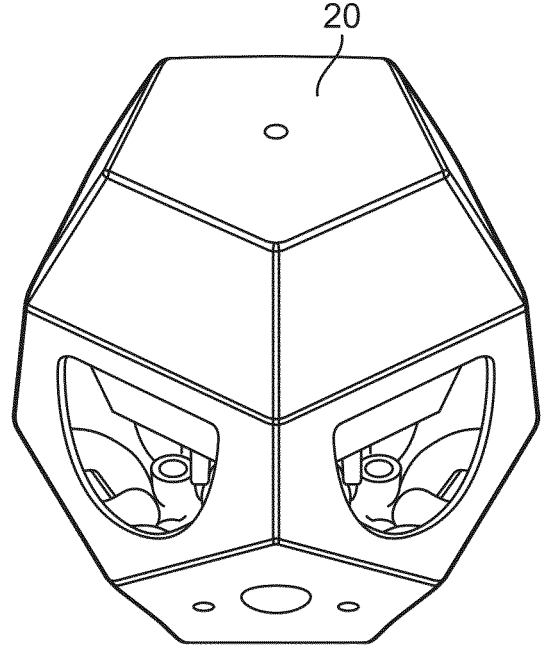
FIG. 2 shows a second perspective view of the present invention.
Figure 3:
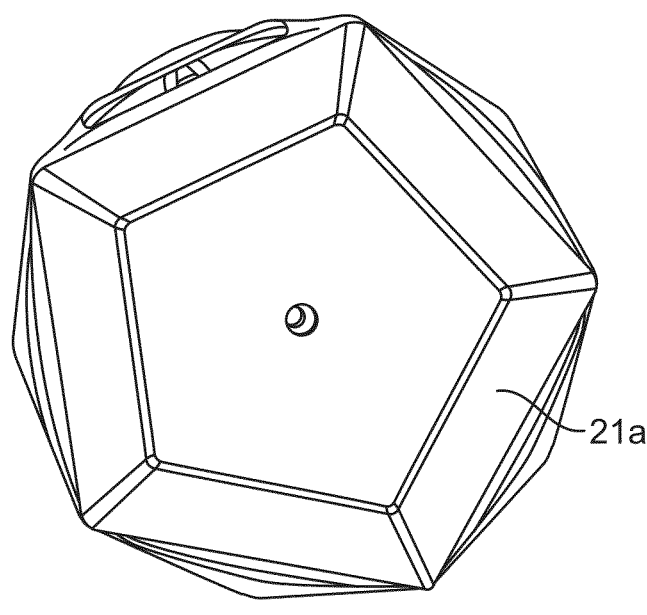
FIG. 3 illustrates a third perspective view of the present invention.
Figure 4:
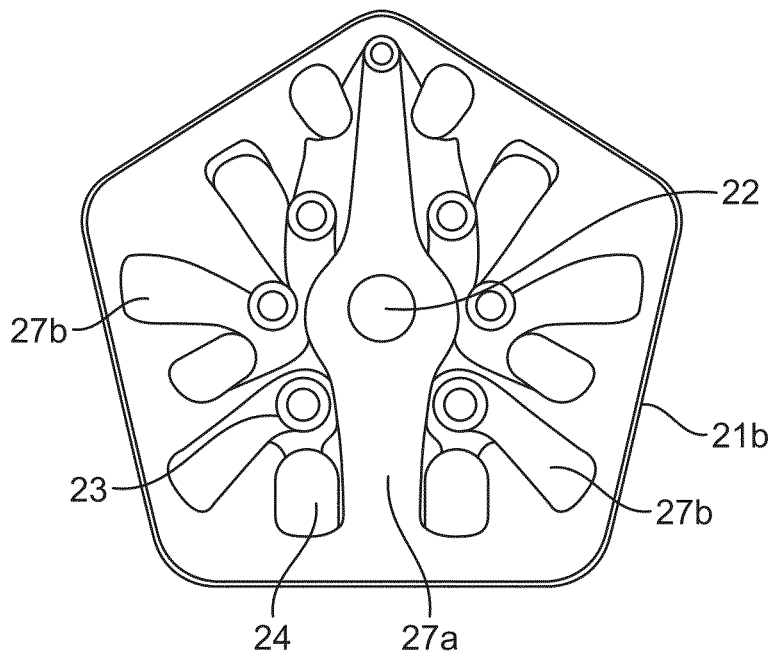
FIG. 4 shows a cross-sectioned view of the present invention according to one embodiment.
Figure 5:
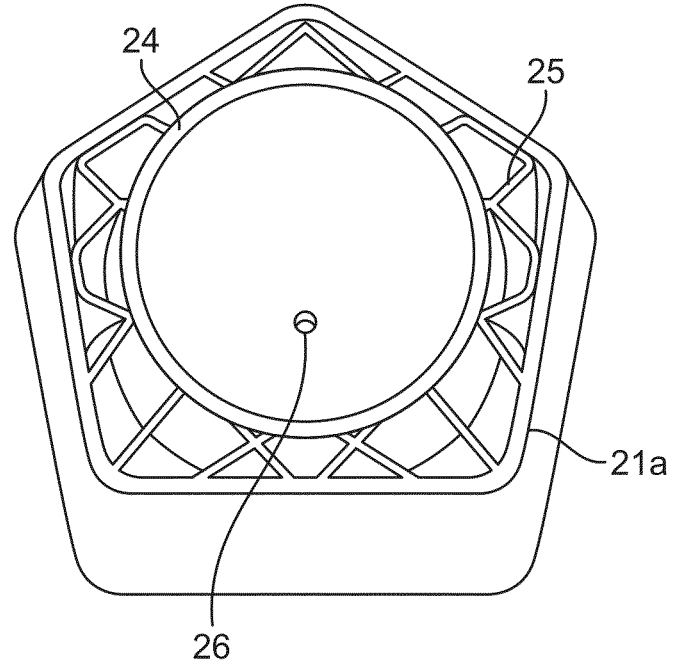
FIG. 5 shows a cross-sectioned view of the present invention according to one embodiment.
Figure 6:
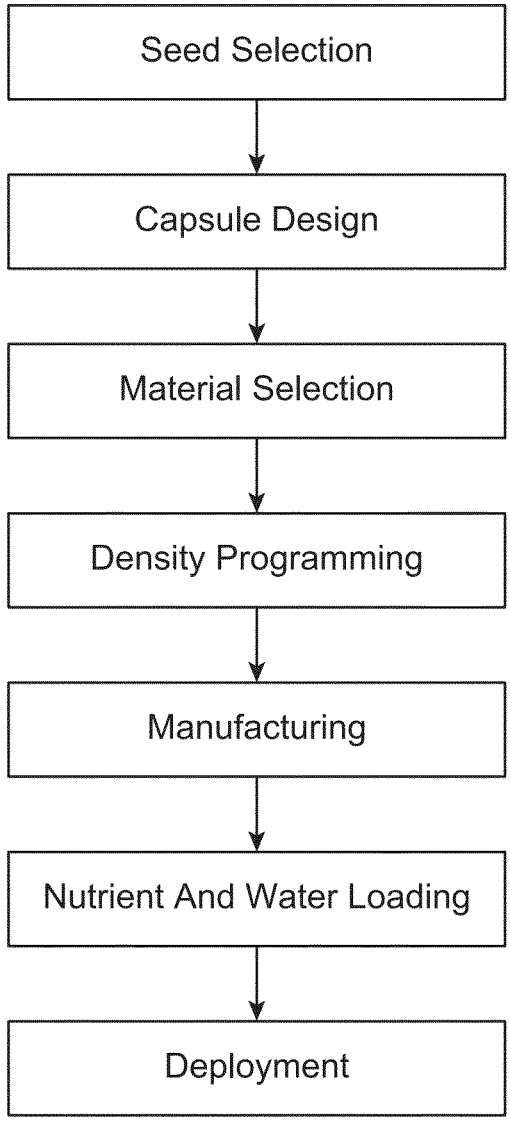
FIG. 6 illustrates a flowchart detailing the various steps of the present invention in accordance with one embodiment.

The invention addresses the impossibility of growing crops in areas with no water like desert environments, the inefficiencies in water and nutrient delivery in traditional agricultural practices, the overuse of chemical fertilizers and genetic modifications to the seeds, the environmental impact of current cultivation methods, the cost associated with human labor or industrialized equipment, the programmability of 3D printing materials in new dimensions such as time-control processes based on water dissolution and, varying densities required to create a five dimensional object capable of solving hyper complex problems such as the quality, cost and availability of plant food for human consumption.

Technical Solution

Density Programming Using Conventional 3D Printing

Hydrolyzed materials like PVA expand upon heating, creating a structure with varied densities and controlled water solubility. This process, achieved through 3D printing, allows for high flexibility and rigidity within the same object, a key design feature that will ensure a cohesive and optimal performance for all parts involved throughout its lifespan.

Controlled Water Release

Channels and reservoirs within the capsule will utilize an embedded programmed dissolution rate based on Fick's Laws of Diffusion, First Order Kinetics and Solubility and Saturation as described by the Noyes-Whitney equation combined together to provide the designer with the ability to predict the time for dissolution based on hydrolysis level of the PVA channels' roadblocks, as well as thickness of the roadblocks and walls, and the environmental conditions. This process ensures dissolution at programmed rates, with gradual hydration and nutrient supply for months and years after being activated.

Mechanical Design

Primarily, The present invention features a housing 20, also termed as capsule, which has a dodecahedron shape that is herein selected for its stability upon impact, as it distributes forces evenly without compromising the overall structure thereof. The housing encloses a central seed chamber 22, peripheral seed chambers 23, and water reservoirs 24. The central seed chamber is located at the core of the dodecahedron and, as its name suggests, holds the primary seed. The central seed chamber 22 may include a water source, in the form of one or more water reservoirs, that delivers a predetermined amount of water directly to the seed, thereby improving the efficiency and optimization of water usage. For instance, the central seed chamber 22 can be divided to allocate a section to hold water, which will become a water source for the seed. The peripheral seed chambers 23 may be symmetrically around the central chamber for additional seeds, thereby promoting symbiotic growth. Between the peripheral seed chambers 23, the present invention may include water reservoirs 24 for the gradual release of water as the material dissolves directly into the seeds. Additionally, the present invention includes nutrient compartments located around the seed chambers to release nutrients at controlled intervals.

Operation of the Present Invention

The capsule is designed to be activated upon mechanical impact, wherein exerting force on the capsule's outer layer causes the material of one of the channels connected to the water reservoirs to dissolve and release water. The dissolution process is initiated by the internal rupture of one of the reservoir channels, and this process begins to unfold using estimated external environmental conditions, such as humidity and temperature.

The housing may include upper channels that may be designed to dissolve more quickly due to their higher solubility rate. When said upper channels start to break down, they allow the first stream of water to reach the central seed chamber, providing initial hydration of the seed. As channels 27b proximal to the water reservoirs 24 dissolve, the water may disperse through a network of internal channels with varying solubility rates, to ensure a sustained release of water. The nutrient compartments, also termed as nutrient pockets, may be located at predetermined points within the capsule, may dissolve at predetermined intervals, to provide a sequential supply of nutrients. In a preferred embodiment, the housing/capsule may include lower channels that may have the least solubility, therefore they may maintain their structure for the longest duration compared to the rest of the channels to provide continuous water and nutrient supply.

The capsule may include an open cavity designed to be in contact with the soil, seeds and nutrients inside thereof, thereby defining a soil interface cavity that may allow for the transfer of dissolved nutrients and water directly to the plant's root system.

Time-Programmability, Construction and Material Composition

The first step involves calculating the size of the upper and lower capsule halves (21a and 21b, respectively). Each half may contain designated channels and reservoirs, which may be designed to provide a predetermined amount of water and nutrients based on the specificity of a targeted seed's ability to grow fully without human intervention. Consequently, the higher the water demand, the bigger the capsule and reservoirs will be. The total amount of water will be estimated by general agricultural knowledge optimized for direct water release.

The second step involves calculating the diameters of the channels. Wherein the diameters are calculated by using the water demand obtained from the first step and the rate of dissolution as outlined in the following step three by combining the forth dimension of Time and the fifth dimension of Density in the design of a 3D objected printing parameters.

The third step involves calculating of the dissolution rate, also termed as time programmability. Based on Fick's Laws of Diffusion, First Order Kinetics and Solubility and Saturation as described by the Noyes-Whitney equation combined, it can be derived that the dissolution time of a material such as PVA can be expressed in terms of its density, thickness, and the solubility rate constant.

The foregoing is given on the assumption that: 1) the dissolution of the PVA follows a first-order reaction with respect to the surface area in contact with water. 2) The process is uniform, meaning the entire surface in contact with water dissolves at the same rate. 3) The solubility rate constant (k) is known and determined experimentally under predetermined environmental conditions by following the subsequent parameters:

A) Base Environment Constant (BeK): in climates with an average daytime temperature of 25 degrees Celsius and 50% relative humidity, a 75% hydrolyzed material like PVA will have a dissolution rate constant of 1. This will be considered the Base Environment Constant (BeK).

B) Temperature Adjustment to BeK: For climates with average daytime temperatures above 25 degrees Celsius, the BeK will increase by 0.1 units per degree Celsius above 25. Conversely, for climates with average daytime temperatures lower than 25 degrees Celsius, the BeK will decrease by 0.15 units per degree Celsius below 25; wherein T is the average daytime temperature in degrees Celsius::

$$\text{Adjusted } BeK \text{ (Temperature)} = BeK + 0.1(T-25); \text{ if } T>25; \text{ and}$$

$$\text{Adjusted } BeK \text{ (Temperature)} = BeK - 0.15(25-T); \text{ if } T<25.$$

C) Humidity Adjustment to BeK: For climates with average daytime relative humidity higher than 50%, the BeK will increase by 0.12 units per percentage point above 50%. For climates with average daytime relative humidity lower than 50%, the BeK will decrease by 0.09 units per percentage point below 50%; wherein H is the average daytime relative humidity in percentage points:

$$\text{Adjusted } BeK \text{ (Humidity)} = BeK + 0.12(H-50); \text{ if } H>50; \text{ and}$$

$$\text{Adjusted } BeK \text{ (Humidity)} = BeK - 0.09(50-H); \text{ if } H<50.$$

5

D) Final Dissolution Rate Constant (Kf): The final dissolution rate constant Kf can be calculated as a function of the adjusted BeK values for temperature and humidity:

$Kf$=Adjusted *BeK* (Temperature)+Adjusted *BeK* (Humidity)

E) Limitation in Freezing Conditions: The above calculation will not hold if the climate temperatures reach freezing conditions (0 degrees Celsius or lower). Under such conditions, the dissolution of the PVA material will be significantly inhibited or halted due to the freezing of the water in the reservoir.

4) Derivation: Expressing mass in terms of volume and density:

$$m=\rho*A*d$$

Setting up the differential equation:

$$\frac{dm}{dt} = -k*A$$

Integrating the differential equation:

$$\int_{m_o}^{0} \frac{dm}{k*A} = \int_{0}^{t_d} dt$$

$$\frac{m_0}{k*A} = t_d$$

Substituting $m_0$ with $$\rho*A*d$$

$$t_d = \frac{\rho*A*d}{k*A}$$

Wherein the final equation is:

$$t_d = \frac{\rho*d}{k}$$

Where:
  $t_d$=Dissolution time
  ρ=Density of PVA
  d=Thickness of the PVA barrier
  k=Solubillity rate constant of the PVA Following the above procedure, it can accurately determine the rate at which a specific reservoir will release its water and the total duration required for its complete release. By strategically employing PVA barriers within the channels, engineered with precision using the aforementioned formula, the total dissolution time can be modulated to match the precise hydration and nutrient demands of a specific seed. This ensures optimal growth conditions are maintained throughout the entire germination and maturation process, thereby eliminating the need for human intervention.

The nutrient pockets may be designed for sequential release due to the varying dissolution rates of the PVA encapsulating them previously calculated. With:

$$t_d = \frac{\rho*d}{k}$$

6

The present invention may also feature channels 27c built within the lower half 21b for sunlight, which can also act as water inlets and outlets. Wherein said channels allow the structure to breathe and control the total water that enters and leaves the present invention. Wherein said inlets and outlets direct water through internal channels, ensuring controlled flow to the soil. The design minimizes water loss and maximizes the efficient use of the stored water, maintaining optimal hydration for the seed. The flow rate is determined by the internal channel design, which in turn may include built-in soluble roadblocks and the rate at which the materials dissolve. Wherein said roadblocks may be small pellets inside the channels that obstruct the water from flowing free, thereby providing a higher level of control for the water release.

A substantial aspect of the present invention is defined as solubility-controlled walls, achieved by selecting materials of different solubility rates to construct the structural elements of the capsule, causing a timed release of water and nutrients. For instance, by selecting materials with varying hydrolysis levels, the dissolution time can be programmed to match the specific needs of the seed. In other words, combining materials with hydrolysis levels $k_1$, $k_2$, . . . , $k1_n$ achieves a multi-phase release system.

The seed's central location is surrounded by a nutrient and hydration system and main channels 27a. The seed bed is designed to widen over time, accommodating the growth of larger roots. This gradual widening is achieved through the controlled dissolution of PVA materials, which are calculated to expand at a rate proportional to root growth.

The present invention may include hair-like filaments that detach from the center channel to facilitate wind-assisted self-pollination. The timing of filament detachment is controlled by the dissolution rate of the PVA material holding them in place, ensuring optimal pollination conditions. Filaments detach when the PVA dissolves, timed to align with predetermined pollination periods; thereby defining self-pollination structures. The filament detachment timing is calculated using the equation:

$$t_f = \frac{\rho_f*d_f}{k_f}$$

Where:
  $t_f$=Filament dissolution time
  $\rho_f$=Density of filament
  $d_f$=Thickness of the filament
  $k_f$=Solubillity rate constant of the filament As the seed grows, it requires increasing amounts of sunlight. The main sunlight channel 26, located on the upper capsule half 21a, may be designed to enlarge as the walls dissolve and the water reservoirs deplete. Initially, the channel provides sun protection for the small seed. As the plant grows, the channel widens, allowing more sunlight to reach the plant. This controlled enlargement is calculated based on the dissolution rate of the PVA materials used in the channel's construction.

It is important to note that the upper half 21a may include a primary water reservoir with larger dimensions to accommodate a greater volume of water. Additionally, both the upper and/or lower halves may feature peripheral walls 25 to enhance the rigidity of the dodecahedron, helping to prevent breakage or collapse upon impact.

In an alternative embodiment, the present invention may further include an anti-evaporation and evapotranspiration layer that may be included based on environmental conditions. For instance, in one embodiment, the present invention may include an additional thin layer of PVA that will capture the water leaving through evapotranspiration, so that the 5-dimensional object doesn't dry out in hot and dry environments. This layer protects the water from evaporation, ensuring it remains in the capsule for as long as the seed needs it. By programming the density within the 5-Dimensional object, a layer that traps water escaping through evaporation without compromising airflow and sunlight radiation inputs is featured. Since PVA is a hydrophilic material, it captures most water through polar entanglement. Any losses in water are compensated by overengineering the total water required. Wherein total water retention of the layer can be calculated using:

$$W_t = W_0 - W_e + W_c$$

Where:

$W_t$=Total water retained
$W_0$=Initial water
$W_e$=Evaporative loss
$W_c$=Compensatory water added through design 5) The density programming feature, as the fifth programmable dimension, involves controlling the density of the 3D printed material during the manufacturing process. By overheating a 75% hydrolyzed PVA by 21.12% of its melting point (200 degrees Celsius) in the 3D printing extruding nozzle, an expansion of 30% will be achieved. This results in an increase in rigidity of 20% and an increase in water solubility of 18%; the increase in water solubility by 18% means that the material will dissolve more quickly when exposed to water, allowing for highly controlled release mechanisms. The rapid cooling of 3D printers allows the expansion shape to be kept in place in the final object. Using these parameters, different mechanical properties, such as flexibility, strength, and solubility, can be achieved within a single object. Any project involving 3D printing can change these parameters while printing, which will, in turn, allow the design of a fourth dimension of time and a fifth dimension of density into a 3-dimensional object.

By leveraging these principles, 3D printed objects can be designed with precisely tuned properties, incorporating the fourth dimension of time (controlled dissolution rates) and the fifth dimension of density (varying material properties within a single object). This advanced control allows for creating a highly functional capsule that provides all the factors that a seed needs to grow without Human intervention.

The foregoing description conveys the best understanding of the objectives and advantages of the present invention. Different embodiments may be made of the inventive concept of this invention. It is to be understood that all matter disclosed herein is to be interpreted merely as illustrative and not in a limiting sense.

What is claimed is:

1. A five-dimensional automated seed capsule for growing plants without human intervention, comprising:

a central seed chamber designed to securely hold the primary seed and provide initial hydration;
peripheral seed chambers arranged symmetrically around the central chamber to promote symbiotic growth;
water reservoirs integrated between the seed chambers, designed to release water gradually as the material dissolves;
nutrient compartments strategically placed around the seed chambers for controlled nutrient release; and
solubility-controlled walls constructed from hydrolyzed polyvinyl alcohol (PVA), programmed for gradual dissolution.

2. The five-dimensional automated seed capsule of claim 1, further comprising: a dodecahedron-shaped housing enclosing the central seed chamber, peripheral seed chambers, and water reservoirs, wherein the dodecahedron shape is designed to distribute impact forces evenly upon deployment.

3. The five-dimensional automated seed capsule of claim 1, wherein the solubility-controlled walls comprise multiple layers of the polyvinyl alcohol (PVA) with varying hydrolysis levels, resulting in programmed dissolution rates calculated using the equation: $td = (\rho * d)/k$; where td is dissolution time, $\rho$ is density of PVA, d is thickness of the PVA barrier, and k is the solubility rate constant of the PVA.

4. The five-dimensional automated seed capsule of claim 1, further comprising: channels with varying diameters, calculated based on water demand and dissolution rate, to control the flow of water and nutrients to the seed chambers.

5. The five-dimensional automated seed capsule of claim 1, further comprising: an anti-evaporation and evapotranspiration layer made of thin PVA, designed to capture and retain water escaping through evaporation, wherein the total water retention is calculated using the equation: $Wt = W0 - We + Wc$; where Wt is total water retained, W0 is initial water, We is evaporative loss, and Wc is compensatory water added through design.

6. The five-dimensional automated seed capsule of claim 1, further comprising: self-pollination structures consisting of hair-like filaments attached to a central channel, designed to detach at predetermined times for wind-assisted pollination, wherein the detachment timing is calculated using the equation: $tf = (pf * df)/kf$; where tf is filament dissolution time, pf is density of filament, df is thickness of the filament, and kf is solubility rate constant of the filament.

7. The five-dimensional automated seed capsule of claim 1, further comprising: a main sunlight channel located on an upper capsule half, designed to enlarge as the walls dissolve and water reservoirs deplete, providing increasing amounts of sunlight as the plant grows.

8. The five-dimensional automated seed capsule of claim 1, wherein the central seed chamber is designed to widen over time through controlled dissolution of PVA materials, accommodating the growth of larger roots at a rate proportional to root growth.

* * * * *